United States Patent
Henry et al.

(10) Patent No.: US 12,231,395 B2
(45) Date of Patent: *Feb. 18, 2025

(54) DEVICE ADDRESS ROTATION MANAGEMENT PROTOCOL FOR A WIRELESS LOCAL AREA NETWORK

(71) Applicant: Cisco Technology, Inc., San Jose, CA (US)

(72) Inventors: Jerome Henry, Pittsboro, NC (US); Robert E. Barton, Richmond (CA); Stephen Michael Orr, Wallkill, NY (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/476,821

(22) Filed: Sep. 28, 2023

(65) Prior Publication Data

US 2024/0031330 A1    Jan. 25, 2024

Related U.S. Application Data

(63) Continuation of application No. 17/556,277, filed on Dec. 20, 2021, now Pat. No. 11,855,960.

(Continued)

(51) Int. Cl.
  *H04L 61/5038* (2022.01)
  *H04W 84/12* (2009.01)
  *H04L 101/622* (2022.01)

(52) U.S. Cl.
  CPC .... *H04L 61/5038* (2022.05); *H04L 2101/622* (2022.05); *H04W 84/12* (2013.01)

(58) Field of Classification Search
  CPC ......... H04L 61/5038; H04L 2101/622; H04W 84/12

(Continued)

(56) References Cited

U.S. PATENT DOCUMENTS 9,385,911 B2 *  7/2016  Vermani ................ H04L 69/18
9,398,010 B1    7/2016  Chickering et al.
(Continued)

FOREIGN PATENT DOCUMENTS

WO    2016/114843 A1    7/2016
WO    WO-2020010126 A1 *  1/2020  ......... H04L 61/1541
(Continued)

OTHER PUBLICATIONS

Henry et al., "Randomized and Changing MAC Address Use Cases," draft-henry-madinas-framework-02, Internet Engineering Task Force, Internet-Draft, May 3, 2021, 18 pages.

(Continued)

*Primary Examiner* — Tauqir Hussain
(74) *Attorney, Agent, or Firm* — Edell, Shapiro & Finnan, LLC

(57) ABSTRACT

Techniques herein facilitate a device address rotation management protocol that may be implemented for a wireless local area network (WLAN), which can be used to influence when wireless client devices or stations may rotate their Media Access Control (MAC) addresses, how to perform such rotations, and/or the like. In one example, a method may include providing, by an access point (AP), a first communication indicating that the AP supports a MAC address rotation management protocol; obtaining, by the AP, a second communication from a wireless station (STA) indicating that the STA intends to perform a MAC address rotation; and transmitting, by the AP, a third communication to influence the MAC address rotation of the STA, the third communication comprising a rotation status indicator and timing information.

20 Claims, 6 Drawing Sheets

Related U.S. Application Data

(60) Provisional application No. 63/190,379, filed on May 19, 2021.

(58) Field of Classification Search
USPC .......................................................... 709/245
See application file for complete search history.

(56) References Cited

U.S. PATENT DOCUMENTS

| | | | | |
|---|---|---|---|---|
| 10,212,583 | B1* | 2/2019 | Hooda | H04W 8/26 |
| 10,237,738 | B2 | 3/2019 | Lee et al. | |
| 10,454,887 | B2 | 10/2019 | Weis et al. | |
| 10,802,202 | B2 | 10/2020 | Gundavelli et al. | |
| 10,805,982 | B1* | 10/2020 | Buckley | H04W 4/90 |
| 11,722,369 | B2* | 8/2023 | Zhou | H04L 5/0048 370/254 |
| 11,855,960 | B2* | 12/2023 | Henry | H04W 76/11 |
| 11,877,334 | B2* | 1/2024 | Ficara | H04W 76/10 |
| 11,962,588 | B2* | 4/2024 | Fang | H04L 61/5038 |
| 2003/0177267 | A1* | 9/2003 | Orava | H04L 63/0407 709/245 |
| 2004/0059909 | A1 | 3/2004 | Le Pennec et al. | |
| 2005/0050352 | A1* | 3/2005 | Narayanaswami | H04W 8/16 713/160 |
| 2006/0120317 | A1* | 6/2006 | Zheng | H04L 61/5046 370/465 |
| 2007/0183375 | A1 | 8/2007 | Tiwari | |
| 2010/0093378 | A1* | 4/2010 | Chin | H04W 52/0216 455/458 |
| 2012/0213211 | A1 | 8/2012 | Remaker | |
| 2012/0284375 | A1 | 11/2012 | Remaker | |
| 2013/0097674 | A1 | 4/2013 | Jindal et al. | |
| 2014/0007236 | A1 | 1/2014 | Krueger et al. | |
| 2015/0063205 | A1 | 3/2015 | Elliott | |
| 2015/0381565 | A1* | 12/2015 | Thaler | H04L 61/5046 370/389 |
| 2016/0135041 | A1* | 5/2016 | Lee | H04L 45/745 726/3 |
| 2016/0135053 | A1* | 5/2016 | Lee | H04W 72/04 726/7 |
| 2016/0269359 | A1 | 9/2016 | Adrangi et al. | |
| 2016/0302058 | A1 | 10/2016 | Mestanov et al. | |
| 2016/0344681 | A1* | 11/2016 | Lambert | H04L 61/5014 |
| 2017/0099645 | A1 | 4/2017 | Lindheimer et al. | |
| 2017/0201930 | A1* | 7/2017 | Chen | H04W 40/02 |
| 2017/0245143 | A1 | 8/2017 | Lindheimer et al. | |
| 2018/0054825 | A1 | 2/2018 | Kourzanov | |
| 2018/0115982 | A1* | 4/2018 | Reddy | H04B 17/318 |
| 2018/0324142 | A1* | 11/2018 | Adrangi | H04L 61/2596 |
| 2019/0037390 | A1* | 1/2019 | Hooda | H04L 45/021 |
| 2019/0075114 | A1 | 3/2019 | Pugaczewski et al. | |
| 2019/0349397 | A1 | 11/2019 | Li et al. | |
| 2019/0357143 | A1* | 11/2019 | Wang | H04W 52/0229 |
| 2019/0386955 | A1 | 12/2019 | Weis et al. | |
| 2020/0107213 | A1 | 4/2020 | Park et al. | |
| 2020/0229071 | A1 | 7/2020 | Ansley et al. | |
| 2020/0244655 | A1 | 7/2020 | Gundavelli et al. | |
| 2020/0351648 | A1* | 11/2020 | Fang | H04L 61/5076 |
| 2021/0036988 | A1 | 2/2021 | McKibben et al. | |
| 2021/0068172 | A1 | 3/2021 | Jeong et al. | |
| 2021/0168115 | A1* | 6/2021 | de la Oliva | H04L 61/5038 |
| 2022/0086627 | A1* | 3/2022 | Montemurro | H04L 61/25 |
| 2022/0167256 | A1* | 5/2022 | Kneckt | H04W 12/02 |
| 2022/0200950 | A1* | 6/2022 | Sekar | H04W 12/06 |
| 2022/0224671 | A1* | 7/2022 | de la Oliva | H04L 61/25 |
| 2022/0264668 | A1* | 8/2022 | Lumbatis | H04W 76/38 |
| 2022/0417734 | A1 | 12/2022 | Ramanathan et al. | |
| 2023/0292315 | A1* | 9/2023 | Li | H04W 72/1273 |

FOREIGN PATENT DOCUMENTS

| | | |
|---|---|---|
| WO | 2020/148062 A1 | 7/2020 |
| WO | 2020/221465 A1 | 11/2020 |
| WO | 2020/229409 A1 | 11/2020 |

OTHER PUBLICATIONS

Andersdotter, "Summary of discussions on randomized and changing MAC addresses 2014-2019," IEEE P802.11 Wireless LANs, doc.: IEEE 802.11-19/588r2, Apr. 2019, 6 pages.

Wikipedia, "CCMP (cryptography)," https://en.wikipedia.org/wiki/CCMP_(cryptography), Jun. 2021, 3 pages.

Cisco, "Configure 802.11w Management Frame Protection on WLC," Document ID: 212576, https://www.cisco.com/c/en/us/support/docs/wireless-mobility/wireless-lan-wlan/212576-configure-802-11w-management-frame-prote.html, Oct. 2020, 7 pages.

IEEE, "IEEE Standard for Information technology—Telecommunications and information exchange between systems—Local and metropolitan networks—Specific requirements—Part 11: Wireless LAN Medium Access Control (MAC) and Physical Layer (PHY) Specifications-Amendment 4: Protected Management Frames.," IEEE Std 802.11w™—2009, Sep. 2009, 111 pages.

Cisco, Meraki, "802.11w Management Frame Protection MFP," https://documentation.meraki.com/MR/WiFi_Basics_and_Best_Practices/802.11w_Management_Frame_Protection_MFP, Oct. 2020, 2 pages.

Henry, et al., "Parental Control Examples," doc.: IEEE 802.11-21/0804r1, https://mentor.ieee.org/802.11/dcn/21/11-21-0804-01-00bh-rcm-parental-control-examples.pptx, May 2021, 12 pages.

Zuniga, et al., "MAC address randomization," draft-zuniga-mac-address-randomization-01, IETF, Network Working Group, Internet-Draft, Jul. 2021, 14 pages.

Ansley, et al., "Proposed Text for ID Query Action Frame," IEEE P802.11, Wireless LANs, https://mentor.ieee.org/802.11/dcn/19/11-19-0496-01-000m-id-query-proposal.docx, Jul. 2019, 4 pages.

Ansley et al., "Proposal for New Action Frame to Aid Mac Randomization Handling," IEEE 802.11-19/0179r3,https://mentor.ieee.org/802.11/dcn/19/11-19-0179-03-0arc-idquery-query-message-proposal.pptx, Jul. 2019, 9 pages.

Marks, "IEEE Std 802c: What's New and Useful in the Overview and Architecture," IEEE 802.1 contribution, https://www.ieee802.org/1/files/public/docs2017/802c-Marks-summary-0917-r0.pdf, Sep. 2017, 42 pages.

Slashdot, "Did MacOS Stop Allowing Changes to Wifi MAC Addresses?," https://mobile.slashdot.org/story/19/10/06/177216/did-macos-stop-allowing-changes-to-wifi-mac-addresses, Oct. 2019, 8 pages.

Volz, et al., "Link-Layer Addresses Assignment Mechanism for DHCPv6," draft-bvtm-dhc-mac-assign-02, Dynamic Host Configuration (DHC), Internet-Draft, Oct. 2018, 18 pages.

Lee, et al., "Problem Statements for MAC Address Randomization," draft-lee-randomized-macaddr-ps-01, Internet Engineering Task Force, Internet-Draft, Sep. 2020, 6 pages.

Ansley, "IEEE P802.11—Randomized and Changing MAC Address (RCM) Study Group (SG)—Meeting Update," https://www.ieee802.org/11/Reports/rcmtig_update.htm, Jan. 2021, 2 pages.

Stretch, "MAC Address Aggregation and Translation as an Alternative to L2 Overlays," https://packetlife.net/blog/2014/nov/18/mac-address-aggregation-and-translation/, Nov. 2014, 9 pages.

Wang, et al., "MAC Address Translation for Enabling Scalable Virtual Private LAN Services?," 21st International Conference on Advanced Information Networking and Applications Workshops (AINAW'07), May 2007, 6 pages.

Android Open Source Project, "Privacy: MAC Randomization," retrieved from https://source.android.com/devices/tech/connect/wifi-mac-randomization, on Dec. 2020, 4 pages.

Bellovin et al., "Privacy-Enhanced Searches Using Encrypted Bloom Filters," Columbia University Computer Science Technical Reports, CUCS-034-07, https://mice.cs.columbia.edu/getTechreport.php?techreportID=483, Apr. 2011, 16 pages.

Razaque, et al., "Restoring the privacy and confidentiality of users over Mobile collaborative learning (MCL) environment," IEEE Transaction Latin America, vol. 9, No. 7, Dec. 2011, 13 pages.

Alibaba Cloud, "The principle of Arp-nat (MAC Address translation)," https://topic.alibabacloud.com/a/the-principle-of-arp-nat-mac-address-translation_8_8_30147619.html, Nov. 2017, 7 pages.

(56) References Cited

OTHER PUBLICATIONS

Wi-Fi Alliance, "WPA3™ Specification," Version 3, WPA3™ Specification Version 3.0, https://www.wi-fi.org/file/wpa3-specification, Dec. 14, 2020, 30 pages.

International Search Report and Written Opinion in counterpart International Application No. PCT/US2022/028925, mailed Jul. 19, 2022, 16 pages.

Amelia Andersdotter, et al., "IEEE. 802.11 Randomized and Changing MAC Addresses Topic Interest Group Report," IEEE P802.11 Wireless LANs, doc.: IEEE 802.11-19/1442r9, https://mentor.ieee.org/802.11/dcn/19/11-19-1442-09-0rm-tig-draft-report-outline.odt, Nov. 14, 2019, 14 pages.

J. Henry, et al., "Randomized and Changing MAC Address Use Cases—Draft-henry-madinas-framework-02," Internet Engineering Task Force, Internet-Draft, Intended status: Informational, May 3, 2021, 18 pages.

* cited by examiner

DEVICE ADDRESS ROTATION MANAGEMENT PROTOCOL FOR A WIRELESS LOCAL AREA NETWORK

CROSS REFERENCE TO RELATED APPLICATIONS

This application is a continuation of U.S. application Ser. No. 17/556,277, filed Dec. 20, 2021, which in turn claims priority to U.S. Provisional Application No. 63/190,379, filed May 19, 2021, the entirety of which is incorporated herein by reference.

TECHNICAL FIELD

The present disclosure relates to wireless communication, and specifically to the rotation or modification of device addresses to improve privacy.

BACKGROUND

In an effort to improve privacy of a wireless device user, many mobile operating system vendors are periodically changing (or "rotating") a device address (e.g., a station address) used to identify a wireless device on a wireless network. By changing the device address, it can be more difficult for an eavesdropper to track a location of a wireless device user, but also, in some circumstances, more difficult to monitor their online activities. While rotation of a wireless device's address can improve privacy, much of the legacy wireless network infrastructure was not designed to accommodate such address rotation, and in many cases, uses the device address as an identifier of the wireless device for a variety of processing.

DESCRIPTION OF EXAMPLE EMBODIMENTS

Overview

Figure 1:
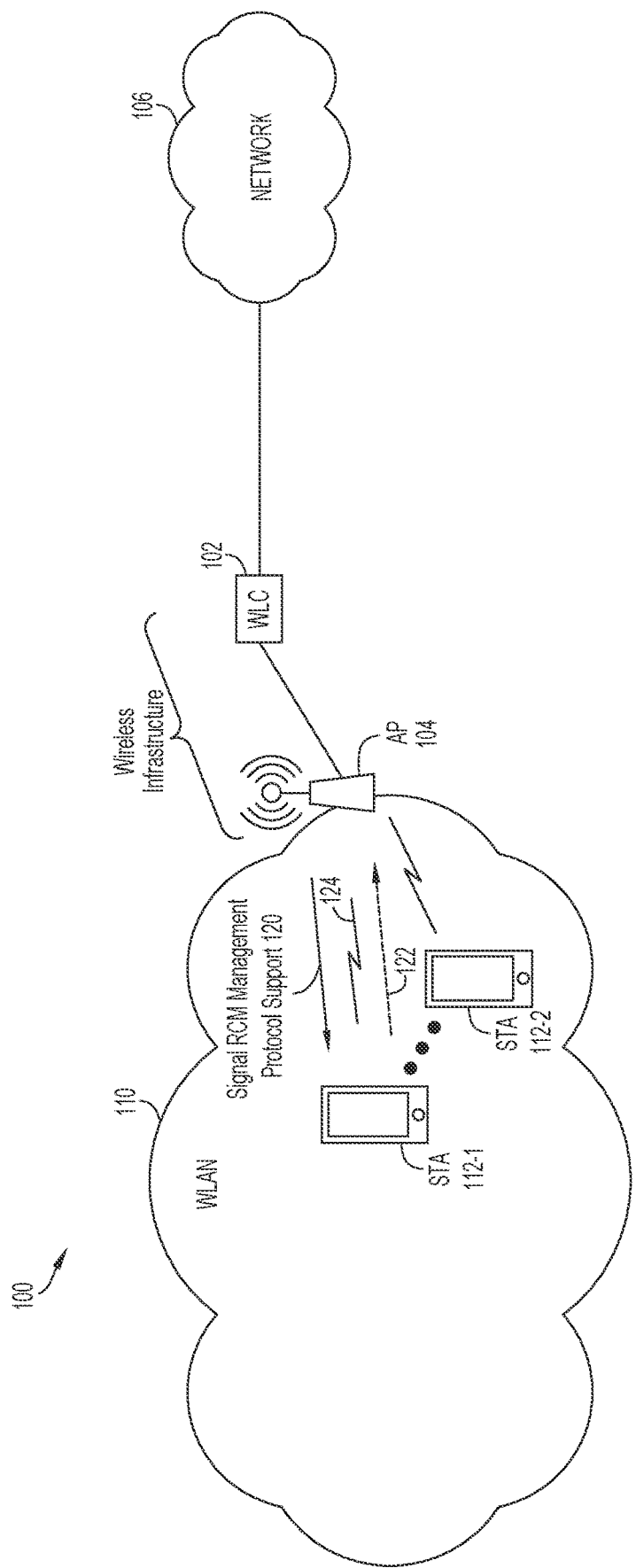
FIG. 1 is a block diagram of a system in which a device address rotation management protocol may be implemented for a wireless local area network (WLAN), according to an example embodiment.

Embodiments disclosed herein provide a device address rotation management protocol that provides address rotation advisory information to a wireless client device or station (STA) from an access point (AP) for a wireless local area network (WLAN). In some instances, the AP can assess risks associated with communication by the STA on the wireless network. The AP can determine and communicate an address rotation strategy for the STA to the STA. The STA can modify its rotation strategy based on the strategy. In some embodiments, the information provided to the STA is further determined based on wireless intrusion prevention system capabilities of the AP and/or a wireless infrastructure.

In one embodiment, a method is provided that may include providing, by an AP, a first communication indicating that the AP supports a Media Access Control (MAC) address rotation management protocol; obtaining, by the AP, a second communication from a wireless station (STA) indicating that the STA intends to perform a MAC address rotation; and transmitting, by the AP, a third communication to influence the MAC address rotation of the STA, the third communication comprising a rotation status indicator and timing information.

EXAMPLE EMBODIMENTS

For current randomized and changing media access control (MAC) address (RCM) mechanisms, wireless client devices or stations (STAs) can rotate their MAC address at pseudo-random intervals. However, the current mechanism is crude, only instantiating a pseudo-random timer in each individual Wi-Fi client driver for a STA, meaning each STA may rotate on irregular frequencies.

Further, current mechanisms have no knowledge of the AP and its state, other STAs within a wireless local area network (WLAN), or anything else in the environment. As a consequence, a STA may choose to de-authenticate, then reauthenticate with a new MAC while the AP has frames for the same STA in its downstream buffer (meaning the AP's resources are wasted).

STAs of a common type (e.g., a combination of attributes, such as equivalent operating systems, and/or hardware), are more likely to exhibit similar address rotation methodologies. For example, some implementations rotate a device address upon a re-association if three hours have elapsed since a previous rotation. When wireless networks become larger, these types of rotation schemes, which are implemented at each STA independent of any other network activity, can disrupt resource allocations at the network infrastructure level. Furthermore, rotation strategies that appear to result in distributed rotations can instead experience environmental conditions that cause multiple STAs to rotate within a relatively short time window of each other. For example, lunch times in a corporate or education environment cause STA movement patterns that increase the probability of association events. Thus, many STAs will take advantage of these association events to rotate their device addresses. Since the address rotation triggering events are not random, the rotations themselves become less random. These bursts in rotation activity can result in resource allocation problems such as dynamic host control protocol (DHCP) scope exhaustion, address resolution protocol (ARP) packet storms, multicast domain name service (mDNS) or universal plug n play (UPnP) overload, AP or a wireless local area network (LAN) controller (WLC) resource exhaustion, or other problems. For example, multiple STAs rotating their MAC at the exact same time may cause confusion or stress on the AP resources (especially if enough STAs rotate their MACs in an aggressive manner). In still some instances, a STA may mistakenly choose a MAC address that is already assigned to another STA, which can cause a duplicate MAC address issue.

Moreover, in some instances, APs and/or WLCs may incorporate wireless intrusion prevention system (WIPS) or Cisco® Advanced Wireless Intrusion Prevention System (aWIPS) functions in order to detect an aggressive actor in a cell and may have a reason to suggest to a STA that it should rotate its MAC as soon as possible. However, current address rotation mechanisms do not allow this interaction. Cisco® is a registered trademark of Cisco® Technology, Inc.

In accordance with embodiments herein, a device address rotation management protocol is provided, which is referred to herein as a randomized and changing MAC address (RCM) management protocol through which an AP and one or more STAs can exchange MAC address rotation control and/or management information that may allow the AP to prompt a STA to execute an RCM action and, in some instances, may provide a frequency or other timing information related to RCM action in order to facilitate MAC address rotations for the STA in a WLAN, such as an Institute of Electrical and Electronics Engineers (IEEE) 802.11 WLAN. More generally, the RCM management protocol can be used to influence when STAs may rotate their respective MAC addresses, which may involve providing a frequency for MAC address rotations that can be performed by a STA, providing timing information indicating when a STA may perform a MAC address rotation, facilitating triggered rotation events, and/or variations and/or extensions thereof, as described herein.

In some embodiments, an AP can switch to monitor or promiscuous mode to detect a variety of types of attacks, and forward detected frames or activity to a security console. An AP will sometimes be equipped with an additional radio for radio frequency and security purposes. Thus, an AP can detect activity that may be indicative of an attack on privacy of an STA. While the AP cannot detect passive scanning, it can detect active probes, replays, evil twins, man in the middle spoof, or other nefarious activity. Thus, an AP can, in some circumstances, detect situations where a faster device address rotation (MAC address rotation) improves temporal STA protection.

Thus, the embodiments herein may provide a model for device address rotation management via the RCM management protocol. Broadly for this model, an AP can advertise that it can provide management of device address rotation. A STA can inform the AP of one or more attributes of the STAs rotation scheme. In some instances, the AP can inform the STA about risks of the rotation scheme. For example, the AP can identify rotation intervals that risk exhaustion of wireless network infrastructure resources and/or re-association failures by the STA. In some instances, the AP can also suggest shorter or longer rotation intervals depending on one or more attributes of the wireless network environment. Messaging between the AP and STA for these functions can be provided via either multicast or unicast addressing.

With reference to FIG. 1 is a block diagram of a system 100 in which a device address rotation management protocol, such as the RCM management protocol, may be implemented for a wireless local area network (WLAN), according to an example embodiment. As illustrated in FIG. 1, system 100 may include a wireless LAN controller (WLC) 102, at least one wireless access point (AP) 104, a network 106, and a WLAN 110. Also shown in FIG. 1 are a number of wireless client devices or stations (STAs) 112-1 and 112-2

Generally, WLC 102 is connected to and communicates with network 106, which may include one or more wide area networks (WANs), such as the Internet, and/or one or more LANs. WLC also communicates with and controls the AP 104, which serves WLAN 110 within which STA 112-1 and STA 112-2 can wirelessly connect to and be served by AP 104. WLC 102 may serve as a bridge to transport traffic (e.g., data packets) between network 106 and WLAN 110 (e.g., between network 106 and STAs 112-1 and 112-2.

Together, WLC 102 and AP 104 may represent and be referred to herein as a 'wireless infrastructure' or 'wireless network infrastructure'. AP 104 provides wireless connectivity, such as IEEE 802.11 wireless connectivity (and variants thereof) for STAs 112-1 and 112-2, which access WLC 102 and network 106 through the AP 104. During operation, STAs 112-1 and 112-2 associate to and are authenticated under control of WLC 102 in order to establish communication sessions within system 100. Once authenticated, STAs 112-1 and 112-2 may exchange packets with network 106 through AP 104 and WLC 102 during the communication sessions, in which case the WLC 102 forwards the packets between the network 106 and the STAs 112-1 and 112-2. In the ensuing description, a wireless station or STA may be referred to interchangeably as a 'wireless client device', a 'client', a 'client device configured to communicate wirelessly', and variations thereof.

During operation, system 100 may facilitate an RCM management protocol, through which AP 104 and one or more STAs 112-1 and/or 112-2 can exchange MAC address rotation control and/or management information that may allow the AP 104 to prompt a STA, such as STA 112-1, to execute an RCM action and, in some instances, may provide a frequency of the RCM action in order to facilitate MAC address rotations for the STA 112-1 in the WLAN 110. In particular, the RCM management processes can be used to influence when STAs 112-1 and/or 112-2 may rotate their respective MAC addresses. In various embodiments, the RCM management processes may provide a frequency for MAC address rotations that can be performed by a STA, can provide timing information indicating when a STA can perform a MAC address rotation, can facilitate triggered rotation events, and/or variations and/or extensions thereof, as discussed in further detail herein.

Consider an operational example involving STA 112-1 and AP 104. During operation, the AP 104 and the STA 112-1 can signal (e.g., as shown at 120 and 122) their support for the RCM management protocol. This signaling 120/122 can take different forms. For example, in various embodiments, AP 104 and/or STA 112-1 can signal support for the RCM management protocol by including a capability indication in any of probe request/responses and/or beacons, or, in some instances, in association request/responses, through use of Robust Action frames. In some embodiments, the AP 104 can signal/advertise to the WLAN 110 that it supports the RCM management protocol (e.g., by setting a bit in an Information Element (IE) of beacons and/or probe responses), and support for the protocol by STAs 112-1 and/or 112-2 may be implicit such that STAs that utilize the protocol may send RCM management messages (included in Robust Action frames) and/or may respond to RCM management messages (included in Robust Action frames), sent from AP 104.

Generally, Robust Action frames are management frames that are protected via the 802.11w Protected Management Frames (PMF) service, which provides for protecting frames through source validation and/or payload protection. For example, Robust Action Frames can carry content in a protected payload in order to hide the content from a potential eavesdropper's view.

As shown at 124, STA 112-1 establishes a protected communication link with the AP 104. At some point in time, consider that STA 112-1 seeks to rotate its MAC address. In accordance with embodiments herein, the STA 112-1 sends a notification to the AP 104 indicating that the STA 112-1 intends to perform a MAC address rotation. In at least one embodiment, the notification may be a Robust Action frame of a type 'RCM management' that includes an RCM change warning/query.

In response, the AP 104 can transmit a request that seeks to influence the intended MAC address rotation of the STA 112-1 in which the request includes a rotation status indicator or code and timing information to influence the intended MAC address rotation of the STA 112-1. In at least one embodiment, the AP 104 can respond to the warning/query obtained from STA 112-1 with an 802.11 Acknowledgement (ACK) frame or a Robust Action frame of a type 'RCM management' that is a request frame (as discussed in further detail below) that includes the rotation status indicator and the timing information.

Upon obtaining the response from the AP 104, the STA 112-1 can rotate its MAC address. The STA 112-1 may or may not communicate its new MAC address to AP 104. For example, in some instances, AP 104 may know the rotation scheme utilized by the STA 112-1 and thus, can determine the new MAC address for the STA 112-1 or, in some instances, the STA 112-1 can communicate its new MAC address to AP 104. As discussed herein, the MAC address rotation performed by a given STA may or may not follow the request to influence the MAC address rotation sent by an AP.

Various terminology is used herein in relation to RCM management protocol exchanges communicated between a STA and an AP. In particular, the terms 'query' and 'request' may have different meanings, depending on the context in which they are used. Per IEEE 802.11 customary usage from the perspective of a STA, a 'query' sent by a STA typically refers to the STA telling an AP that it wants to perform some action (e.g., rotate its MAC address), possibly asking the AP for contextual information useful to the action, and to which the AP can provide a response (e.g., a request to influence the MAC address rotation, or provide additional information that may be useful for the STA action), and the STA can perform the action either as it wants or its action may be influenced by the response obtained from the AP. Thus, a 'query' sent by a STA in this context may be referred to interchangeably as an 'informational query' in which the STA is providing information to an AP regarding some action that the STA intends to perform. Further, a 'warning' sent by a STA is considered analogous to a 'query', such that the warning is considered to be informational regarding some action that the STA intends to perform.

In contrast, a 'request' sent by a STA to an AP typically refers to the STA seeking permission from the AP to perform some action, to which the AP can respond with a grant of permission or not. Thus, from the perspective of a STA sending a 'request' to an AP, the AP is considered the authority regarding an action for which the STA is seeking permission to perform, whereas a 'query' sent from a STA to an AP is considered to be more informational regarding some action that the STA intends to perform (i.e., the STA is not asking permission to perform the action but rather is informing the AP that the STA intends to perform such action).

From the perspective of an AP, an AP can respond to a query received from a STA with another query that includes a request, which is a suggestion (e.g., "MAC address rotation not recommended"), however, the request sent from the AP does not mandate a reaction/response from the STA, since the request was sent in the context of a response to an informational query received from the STA.

In accordance with embodiments herein, warning/query and request exchanges communicated between a STA and an AP in accordance with the RCM management protocol can be facilitated through the use of Robust Action frames, which can be encoded as RCM management warning/query frames or RCM management request frames.

Figure 2:
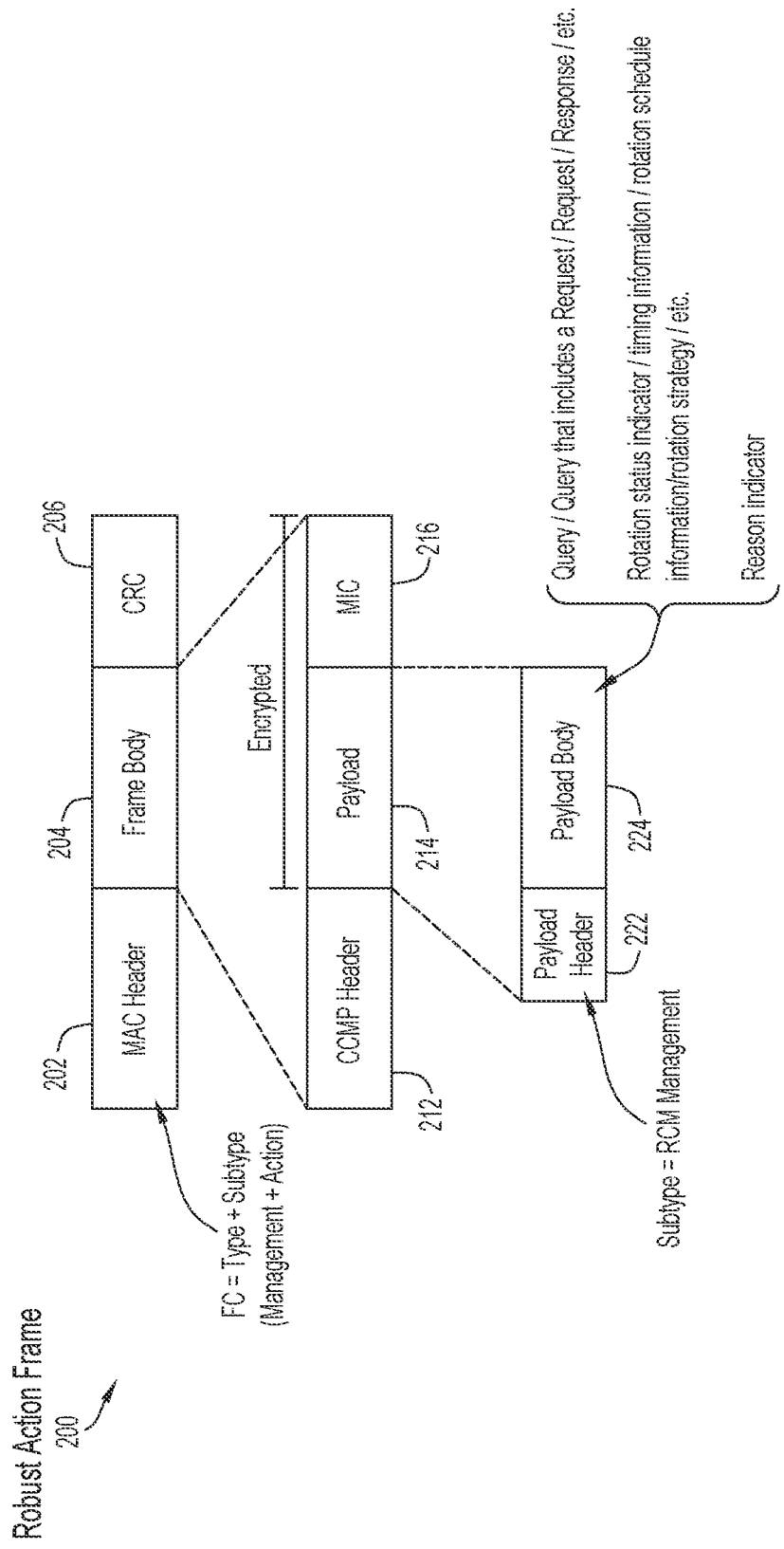
FIG. 2 is a schematic diagram illustrating example details associated an example Robust Action frame that may be utilized for communications between an AP and a STA in accordance with the device address rotation management protocol, according to an example embodiment.

Referring to FIG. 2, FIG. 2 is a schematic diagram illustrating example details associated with an example Robust Action frame 200 that may be utilized for communications exchanged between an AP and a STA in accordance with the RCM management protocol, according to an example embodiment.

As illustrated in FIG. 2, the Robust Action frame 200 may include a MAC header portion 202, a frame body portion 204, and a Cyclic Redundancy Check (CRC) portion 206 (for error checking/validation). Among other information, such as address information, QoS control information, etc. as prescribed by IEEE 802.11 standards, the MAC header portion 202 may include a Frame Control (FC) portion including respective type and subtype information respectively indicating 'Management' and 'Action' for the Robust Action frame.

The frame body portion 204 may include a CCMP (Counter Mode Cipher Block Chaining Message Authentication Code Protocol) header portion 212, a payload portion 214, and a Message Integrity Check (MIC) portion 216 (for error checking/validation). Generally, the CCMP header portion 212 indicates that the rest of the frame body portion 204 (i.e., payload portion 214 and MIC portion 216) is encrypted and provides values/information that is to be used to decrypt the encrypted portion.

The (encrypted) payload portion 214 can further include a payload header portion 222 and a payload body portion 224.

The header portion 222 is used to identify where the 'action' part of the frame begins and can include a subtype identifier indicating that the frame is an RCM management frame. In at least one embodiment, the value of the subtype identifier indicating 'RCM management' may be set by the Internet Assigned Numbers Authority (LANA).

The payload body portion 224 may be of variable size and can include any other identifiers, indicators etc. that can be used to identify whether the RCM management frame is a warning/query, a warning/query that includes a request, a request, a response, etc. The payload body portion 224 may further carry any combination of information that may be sent by an AP (e.g., a rotation status indicator or code, timing information (e.g., delay timer value, rotation timer, etc.), and optionally a reason indicator) or by a STA (e.g., rotation schedule information, rotation strategy, etc.). In one illustrative example, which is not meant to limit the broad scope of embodiments herein, the payload body portion 224 may include a first set of bits (e.g., 2-3 bits) that can be used to identify whether the RCM management frame is a query, a query that includes a request, a request, a query that includes a request, a request, a response, etc. followed by a second set of bits that can carry additional meaning (e.g., rotation status indicator, etc., as discussed herein)

For example, in some instances, the payload body portion 224 for a Robust Action frame sent by a STA may carry schedule information a rotation timer value or a maximum interval in time units, which may indicate that the STA intends to perform MAC address rotations at random intervals, with a maximum interval of the rotation timer value/maximum interval time. In another example for a Robust Action frame sent by an AP, the payload body portion 224 may carry timing information and a rotation status indicator (e.g., "rotation not recommended" or "rotation recommended"). In some embodiments if rotation is not recommended, the rotation status indicator may further carry information indicating a reason that rotation is not recommended (e.g., "buffered downstream traffic present," "previous address validation still in progress," "AP resources exhausted," etc.). Any of a rotation status indicator, reason indicator, etc. discussed herein may be any a value, alphanumeric string, combinations thereof, and/or the like that may be used to communicate one or more status codes and/or reason codes in accordance with embodiments herein.

Consider various operational examples involving various RCM management exchanges between STA 112-1 and AP 104 discussed with reference to FIGS. 3 and 4 that may illustrate various features through which the RCM management protocol can be used to influence MAC address rotation of STA 112-1, in accordance with various example embodiments.

Figure 3:
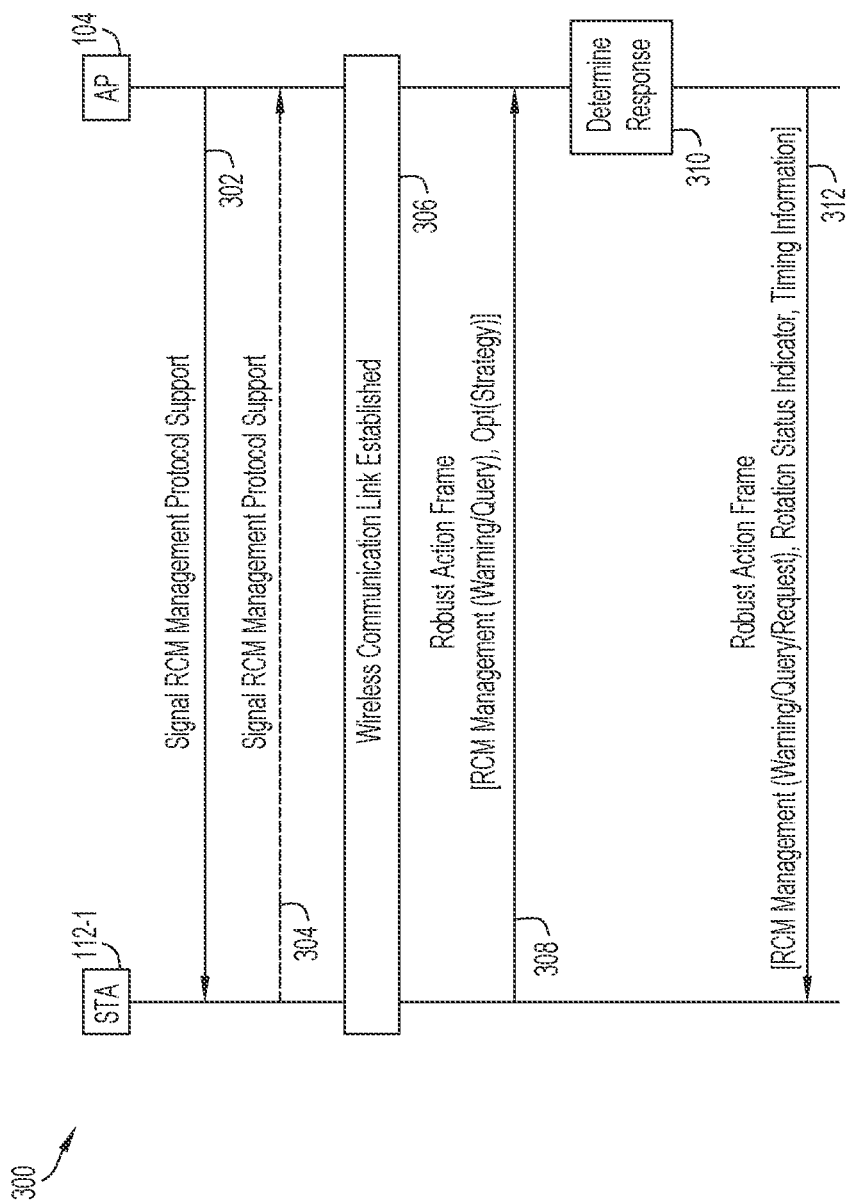
FIG. 3 is a message sequence diagram illustrating a call flow associated with communications that can be exchanged between a wireless station (STA) and an access point (AP) of the WLAN of FIG. 1 in accordance with the device address rotation management protocol, according to an example embodiment.

As illustrated in FIG. 3, which is a call flow 300 illustrating communications that can exchanged between STA 112-1 and AP 104 in accordance with the RCM management protocol according to an example embodiment, the AP 104 can signal to STA 112-1 that it supports the RCM management protocol via one or more transmissions, as shown at 302. In at least one embodiment, STA 112-1 may also signal to AP 104 that it supports the RCM management protocol, as shown at 304. For example, in various embodiments, AP 104, and potentially STA 112-1, can signal support for the RCM management protocol by including a capability indication in any of probe request/responses and/or beacons, or, in some instances, in association request/responses, or through use of Robust Action frames. In another embodiment, the AP 104 can signal/advertise to the WLAN 110 that it supports the RCM management protocol, and support for the protocol by STA 112-1 may be implicit such that the STA 112-1 may send RCM management messages (included in Robust Action frames) and/or may respond to RCM management messages (included in Robust Action frames) sent from AP 104. In some embodiments, the support for the RCM management protocol can be indicated in a bit in an extended capabilities information element (IE). At 306, consider that a wireless communication link is established between STA 112-1 and AP 104, for example, using conventional 802.11 authentication/association processes.

At 308, consider that STA 112-1 communicates a Robust Action frame to AP 104 that is a RCM management warning/query frame indicating that STA 112-1 intends to perform a MAC address rotation. In some embodiments, the RCM management warning/query frame may include information that informs the AP 104 of one or more characteristics of the MAC address rotation strategy of STA 112-1. For example, the RCM management query includes indications of one or more of: that a rotation is imminent; schedule information including a rotation timer value or a maximum interval in time units, which may indicate that a STA intends to perform MAC address rotations at random intervals, with a maximum interval of the rotation timer value/maximum interval time; a predefined RCM scheme; or a maximum time interval between rotations in time units. In some embodiments, the RCM management warning/query frame may include an indication requesting that the AP 104 respond with an indication of a maximum time interval between MAC address rotations.

Upon obtaining the RCM management warning/query frame indicating that STA 112-1 intends to perform the MAC address rotation, the AP 104 can determine a response, as shown at 310, and can communicate, based on the determined response a Robust Action frame to STA 112-1, as shown at 312, that is an RCM management frame that can be a warning/query that includes a request, which is referred to herein as an RCM management request frame. In some instances, as discussed in further detail below with reference to FIG. 4, the AP 104 can send an unsolicited RCM management request frame.

The response determined by the AP 104 and the resultant RCM management request frame sent by the AP 104 can be varied depending on different implementations and/or depending on information obtained from the STA 112-1 via the RCM management warning/query frame. Consider various illustrative examples involving potential RCM management request frames that might be sent by the AP 104 depending on various implementations and/or information obtained from STA 112-1 via the RCM management warning/query frame, as discussed herein below.

For example, in still some embodiments, if the RCM management warning/query frame obtained from the STA 112-1 by the AP 104 at 308 indicates that the MAC address rotation by the STA is imminent and the AP 104 determines at 310 that the STA may proceed with the rotation, then the AP 104 can transmit an RCM management request frame acknowledging the imminence of the STA's rotation. For example, the RCM management request frame can include a rotation status indicator indicating "rotation recommended" and the timing information can include a delay timer value set to '0' to indicate that the STA 112-1 can immediately rotate its MAC now or at any time of its choice.

In other scenarios, the AP 104 may determine at 310 that MAC rotation is not suitable at a particular moment. In such scenarios, the AP 104 can reply to the STA 112-1 RCM change warning/query with an RCM Robust Action Frame that can be a warning/query that includes a request (i.e., an RCM management request frame) in which the request includes a rotation status indicator or code indicating "rotation not recommended." In some embodiments, an additional reason code may be included in the rotation status indicator, which can indicate additional information, such as conditions, etc. (e.g., as to why the rotation is not recommended), such as "buffered downstream traffic present," "previous address validation still in progress," "AP resources exhausted," etc.

In at least one embodiment, timing information included in the frame can also include a comeback timer (e.g., indicating "try again in 'X' time units"), such that the STA 112-1 may be expected to send another warning/query to the AP 104 indicating that it intends to perform a MAC address rotation upon expiration of the comeback timer. In at least one instance, such as for an embodiment in which a reason indicator is included with the rotation status indicator, the comeback timer may be open-ended (having no specific value), such that the AP 104 is expected to signal back to STA 112-1 when the reported issue has been solved. Thus, in this instance, an open-ended comeback timer may indicate to the STA 112-1 that it is to await an instruction from the AP 104 before performing a MAC address rotation. For example, if the AP 104 has buffered downstream data to be sent to the STA 112-1, once the AP 104 sends the remaining traffic in its buffer to the STA 112-1, then the AP 104 can send an unsolicited RCM management request frame with a rotation status indicator indicating "rotation recommended" and the timing information can be a delay timer value set to '0' to indicate that the STA 112-1 can immediately rotate its MAC now or at any time of its choice. In some embodiments, the RCM management request frame may include a delay timer value set to a non-zero value (e.g., delay time value is 'X' time units) to indicate an alternative delay time before the STA 112-1 is requested to perform the MAC address rotation.

In at least one embodiment, consider that the AP 104 (or the wireless infrastructure in general, e.g., with aWIPS) detects an attacker in WLAN 110 (e.g., that is sending spoofed probe responses or other spoofed management frames). Potential attacks/attackers can be detected using a variety of techniques. For example, the typical way for STA to initiate an attack is to send unsolicited probe responses, such that the STA spoofs the MAC address of an AP and pretends to be the AP to snoop information from other STAs. Some APs/wireless infrastructure include hashing/signature functionality for signing probe responses and, based on verifying the authenticity of probe responses using such hashing/signature functionality, it can be determined if probe responses are being sent from authentic APs or from rogue device(s). In some instances, detection of unsolicited management frames being sent by a potential attacker to force a STA to re-authenticate can be used to determine an attack/attacker. In still some instances, signal labels can be used to detect potential attackers. Thus, a variety of techniques can be used to detect potential attacks/attackers in a given WLAN.

In a scenario in which the AP 104/wireless infrastructure detects an attacker, the AP/infrastructure may, in some embodiments, determine that 1) one or more particular STA(s) are targeted and 2) this/these STA(s) have not rotated their MAC address for some threshold period of time. In such a scenario, the AP 104 can then send an RCM management request frame to each STA utilizing the rotation status indicator and timing information as for the example above (e.g., "rotation recommended" and delay timer value set to 0).

In some embodiments, consider that the STA 112-1 may share its general rotation schedule with the AP 104 within the RCM management warning/query frame sent at 308 in which the rotation schedule may include a rotation timer value or a maximum interval in time units, which may indicate that STA 112-1 intends to perform MAC address rotations at random intervals, with a maximum interval of the rotation timer value/maximum interval time (e.g., "30 minutes", to indicate that the STA may rotate its MAC at random intervals, with a maximum interval of 30 minutes). In such embodiments, the AP 104 may signal back to the STA 112-1 its capability within the RCM management request frame as to whether or not it can support the rotation schedule using any combination of the rotation status indicator and timing information included in the RCM management request frame. In all cases, it is understood that a faster rotation schedule provides better MAC obfuscation, and thus better privacy protection (e.g. faster rotations may be advantageous in riskier environments and slower in less risky environments). However, the AP 104 or the infrastructure may not have sufficient resources to process too many rotations at close intervals (especially in crowded WLANs, such as hotspots).

Thus, in some embodiments, the AP 104 may respond to the STA 112-1 warning/query with an ACK or an RCM management request frame including a rotation status indicator indicating "rotation recommended" and the timing information including no specific rotation timer value (e.g., a rotation timer value set to a reserved value, for example, 255 (potentially meaning that the AP is capable of supporting the rotation schedule indicated by the STA or that the rotation schedule is acceptable) or a rotation timer value set to a reserved value of 'null' (potentially meaning don't rotate now or that the AP is not capable of supporting the rotation schedule, which in the context of a rotation schedule/rotation timer value may have a different meaning as compared to a delay timer value, as discussed above), or to, or, in some embodiments may respond with an alternate proposal, such as an alternate rotation timer interval/value.

For example, an alternate rotation timer value sent by the AP 104 may suggest larger interval value than the interval obtained from the STA 112-1 (e.g., a one hour maximum interval if the STA 112-1 indicated interval is 30 minutes), which would have the effect to slow down the rotation pace, still with the expectation that the interval is random within that maximum interval. In another example, an alternate rotation timer value sent by the AP 104 may suggest smaller interval value than the interval obtained from the STA 112-1 (e.g., a 20 minute max interval if the STA 112-1 indicated interval is 30 minutes), which would allow the AP 104 to signal an indication that it can support for a faster rotation scheme. In yet another embodiment, the AP 104 may offer a time period window within the timing information in which the STA 112-1 is requested to generate a random number within the time period window in order to choose its next rotation time.

In some embodiments, even if the STA 112-1 has not shared its rotation schedule with the, the AP 104 can include timing information within the RCM management request frame indicating a suggested maximum RCM rotation time interval (e.g., suggest rotation within X time units maximum). In still some embodiments, the RCM management request frame can be transmitted by AP 104 in response to receiving a RCM management warning/query from STA 112-1 requesting a suggested rotation interval.

Various operations at the STA 112-1 may result from requests/recommendations sent by AP 104 via the RCM management request frame. For example, the STA 112-1 may choose to act in accordance with indications provided in the RCM management request frame, or may choose to operate independent of the indications. It is understood that in all cases that the STA 112-1 ultimately determines its rotation interval and time.

However, when an associated STA rotates its MAC faster than an AP can support, the AP may reject the new MAC address of the STA by refusing the reassociation, the re-authentication, or a new association (depending on whether the STA fully deassociates/deauthenticates or not before the rotation) by responding with a failure message and, in some embodiments, a reason code (e.g., AP resources exhausted, "STA not authorized at this location" or the like).

Thus, in some cases, operating independent of indications provided by the AP 104 in the RCM management request frame (e.g., ignoring the requests/recommendations) may increase a risk of authentication, association, and/or reassociation failure by the STA 112-1 at a later time.

Consider an example discussed with reference to FIG. 4, which is a call flow 400 illustrating communications that can exchanged between STA 112-1 and AP 104 for a scenario in which STA 112-1 may choose to ignore a request/recommendation sent by AP 104 in an RCM management request frame, according to an example embodiment.

As shown at 402, consider that RCM management protocol support signaling may be performed by AP 104 and, in some instances STA 112-1, for example, as discussed above at 302 and 304 for FIG. 3. At 404, consider that a wireless communication link is established between STA 112-1 and AP 104, for example, using conventional 802.11 authentication/association processes.

At 406, consider that an RCM management protocol signaling exchange is performed between STA 112-1 and AP 104. For example, consider that STA 112-1 communicates a Robust Action frame to AP 104 that is a RCM management warning/query frame indicating that STA 112-1 intends to perform a MAC address rotation, as discussed above at 308 for FIG. 3. For the embodiment of FIG. 4, consider that the RCM management warning/query frame includes an indication that the STA 112-1 intends to imminently perform a MAC address rotation. For the exchange at 406, consider that AP 104 determines that it has insufficient resources to support the rotation and responds with an RCM management request frame that includes a rotation status indicator indicating, "rotation not recommended" and timing information including a comeback timer value indicating that the STA 112-1 is to try again in 40 minutes.

Figure 4:
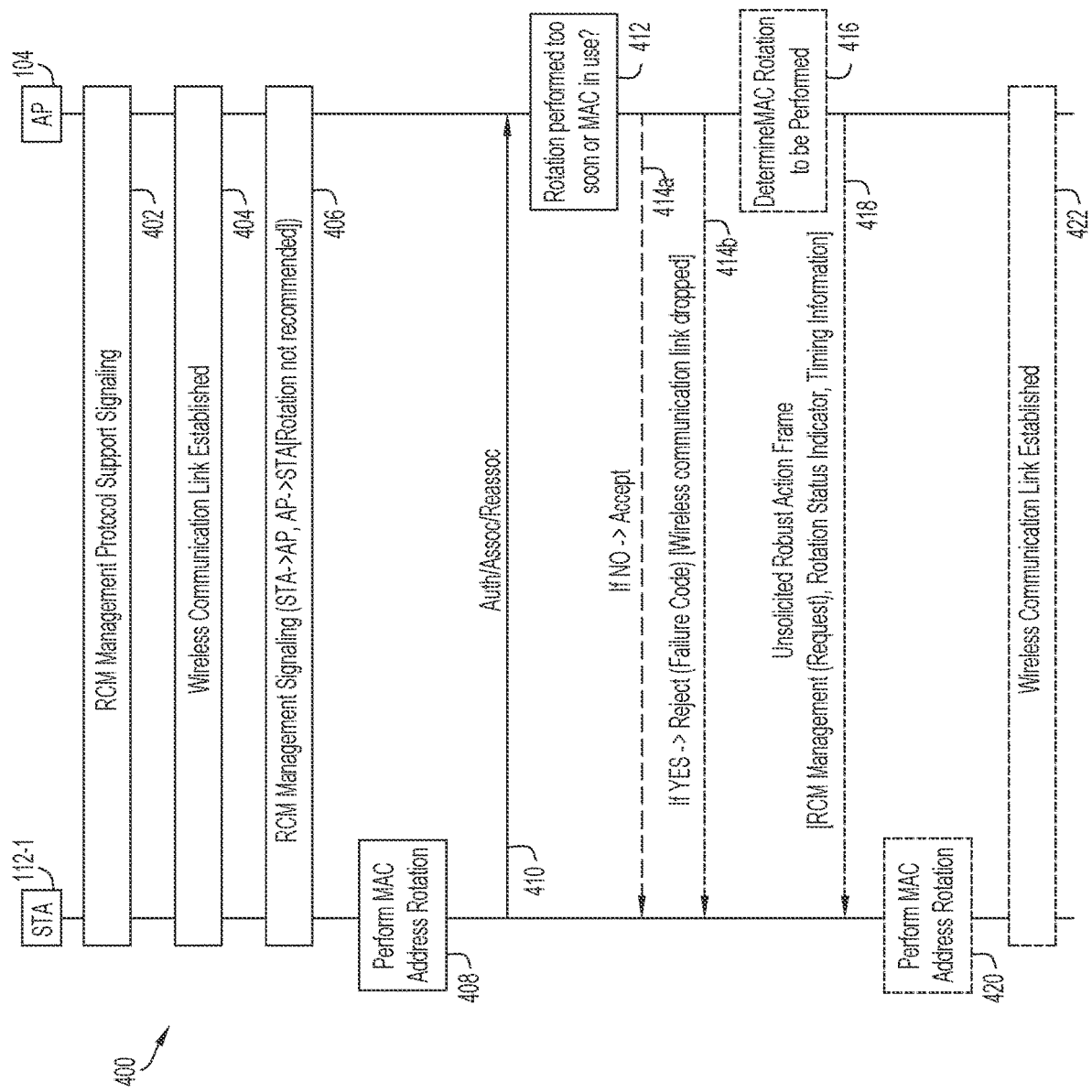
FIG. 4 is another message sequence diagram illustrating another call flow associated with communications that can be exchanged between the STA and the AP of the WLAN of FIG. 1 in accordance with the device address rotation management protocol, according to an example embodiment.

However, for the embodiment of FIG. 4 consider that STA 112-1, as shown at 408, ignores the request received from AP 104 and proceeds to perform the MAC address rotation before the expiration of the 40 minutes (regardless of whether the STA 112-1 shared its rotation schedule with the AP 104 or not). Thereafter, as shown at 410, the STA 112-1 sends a new authentication message, a new association message, or a reassociation message to AP 104 using the new MAC address. At 412, the AP 104 can determine, based on obtaining the new MAC address, whether the STA 112-1 performed its rotation too soon, for example, before expiration of the 40 minutes or, in some cases, if the new MAC address received from the STA 112-1 is a MAC address for which the AP 104 already has a recorded and active session (e.g., there STA 112-2 may have an unterminated session with AP 104 using the MAC address). If the AP 104 determines that the rotation was not performed too soon or that the MAC address is not in use, the AP 104 can accept the authentication/association/reassociation of the STA 112-1, as shown at 414a and communication link for the STA 112-1 may be maintained.

However, for the embodiment of FIG. 4, consider that the AP 104 determines that the MAC address presented by STA 112-1 is currently in use for an active session by STA 112-2 (not shown in FIG. 4) and thus, at 414b, transmits a failure message to STA 112-1 that includes a reason code "address already in use" or something more generic (e.g., "STA not authorized at this location," such as IEEE 802.11-2020 status code 30). Thus, the authentication/association/reassociation of the STA 112-1 fails and the communication link between AP 104 and STA 112-1 is dropped.

Thereafter, at some later time consider that AP 104 determines at 416 that the MAC address rotation of the STA 112-1 should be performed (e.g., because the AP has declined/delayed the rotation multiple times, because the STA 112-1 subsequently has not attempted further rotation, or because the AP 104 experiences a trough in its resources utilization and, thus computes that now is the right time to trigger one or more rotations, before resource consumption increases again). Thus, at 418, AP 104 transmits an unsolicited Robust Action frame to STA 112-1 that is an RCM management request frame, which, in the context the example of FIG. 4 is considered an unsolicited RCM management request frame that includes a rotation status indicator indicating "rotation recommended" and timing information including a delay timer set to "0" to indicate that STA 112-1 may immediately perform a MAC address rotation. At 420, consider that STA determines to follow the request and performs a MAC address rotation and thereafter performs an authentication/association with AP 104 to re-establish a protected wireless communication link with AP 104, as shown at 422.

The outcome of the techniques described herein involving the RCM management protocol are to optimize and maximize STA rotation procedures to ensure that STAs can rotate their MAC addresses as often as possible, while still ensuring that infrastructure resources are preserved. The techniques may also provide for the ability of an AP to influence rotation schedules to optimize resources and provide better security to the STAs.

As noted above, it is understood that STAs may choose to act in accordance with recommendations/requests or may choose to operate independent of such recommendations/requests. Even in a mixed environment in which some STAs (that support the RCM management protocol) follow AP requests/recommendations and other STAs choose not to follow AP requests/recommendations, the RCM management protocol may optimize and maximize rotation schedules and WLAN resources, as well as provide improved security to STAs. In such a scenario, it is expected that an AP will try to provide information/requests that are intended to keep STAs safe, but if some STAs ignore AP requests/recommendations, then the AP can drop or choose to reject connections of such STAs or the STAs may be at risk of being eavesdropped against and/or attacked. However, for STAs that follow the requests/recommendations, it expected that the STAs may receive better security within the WLAN and/or may receive a better use of WLAN resources. Thus, those STAs that adhere to requests/recommendations provided via the RCM management protocol, even in a mixed mode environment, can be expected to benefit from the techniques described herein.

Figure 5:
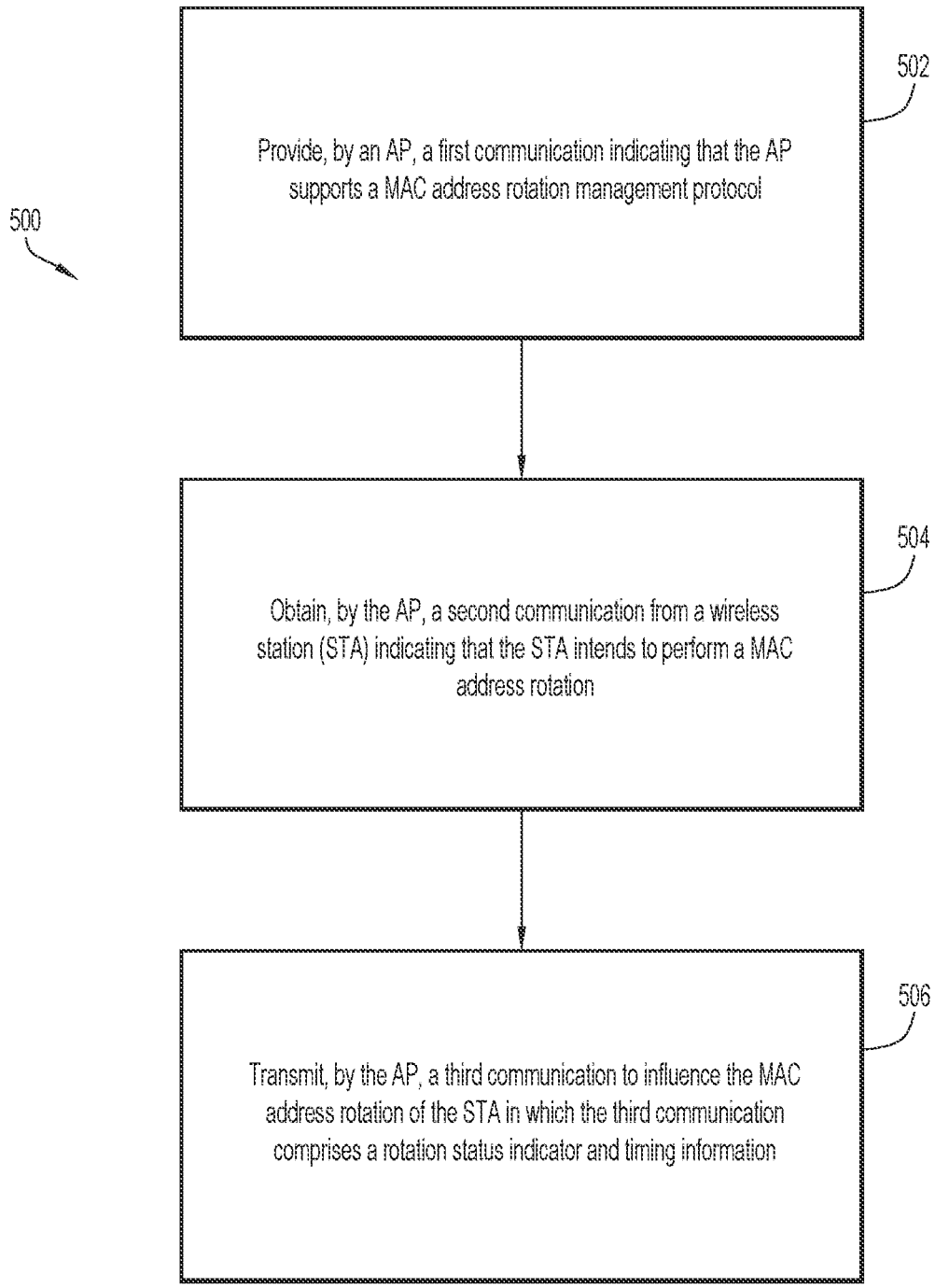
FIG. 5 is a flow chart depicting a method according to an example embodiment.

Referring to FIG. 5, FIG. 5 is a flow diagram depicting a method 500 according to an example embodiment. In at least one embodiment, method 500 illustrates example operations that may be performed by an AP, such as AP 104, in accordance with embodiments of the RCM management protocol described herein.

At 502, the method may include providing, by AP, a first communication indicating that the AP supports a MAC address rotation management protocol (e.g., the RCM management protocol). In various embodiments, the AP can signal support for the RCM management protocol by including a capability indication in any of probe request/responses and/or beacons, or, in some instances, in association request/responses, through use of Robust Action frames.

At 504, the method may include obtaining, by the AP, a second communication from a wireless station (STA) indicating that the STA intends to perform a MAC address rotation. In at least one embodiment, the second communication may be a Robust Action frame including an RCM management warning/query frame, as discussed herein. In some embodiments, the RCM management warning/query frame may include information indicating the MAC rotation strategy of the STA (e.g., rotation schedule, etc.).

At 506, the method may include transmitting, by the AP, a third communication to influence the MAC address rotation of the STA in which the request comprises a rotation status indicator and timing information. In at least one embodiment, the third communication may be a Robust Action frame that is a warning/query including a request (e.g., an RCM management request frame). Each of the Robust Action frame that is the RCM management warning/query frame and the Robust Action frame that is the RCM management request frame may include a subtype identifier indicating that each Robust Action frame is associated with the MAC address rotation management protocol (e.g., the "subtype=RCM management" indication as discussed above with reference to FIG. 2). In various embodiments, the rotation status indicator can include any status code and, in some instances, any reason code, indicating any information as discussed for embodiments herein and the timing information can include any time value (e.g., delay time value/interval, rotation time value/interval, max time interval, reserved/null value, etc.).

Although various examples discussed herein have described that certain timer values may correspond to certain requests/recommendations, such as '0' for a delay timer value indicating for a STA to immediately perform a MAC address rotation, a null value or '0' for a rotation timer value indicating that a STA is not to perform a MAC address rotation, or any other value that may be discussed with reference to examples herein, it is to be understood that the example values are provided for illustrative purposes only and are not meant to limit the broad scope of embodiments herein. Further, it is to be understood that rotation status indicators and reason indicators (e.g., status codes and reason codes) described herein are provided for illustrative purposes only and are not meant to limit the broad scope of embodiments herein. Any timing information/intervals/values, as well as any rotation status indicators and/or reasons included within such rotation status indicators may be used to provide any requests/recommendations in accordance with embodiments herein for an RCM management protocol and, thus, are considered to be within the scope of embodiments herein.

Figure 6:
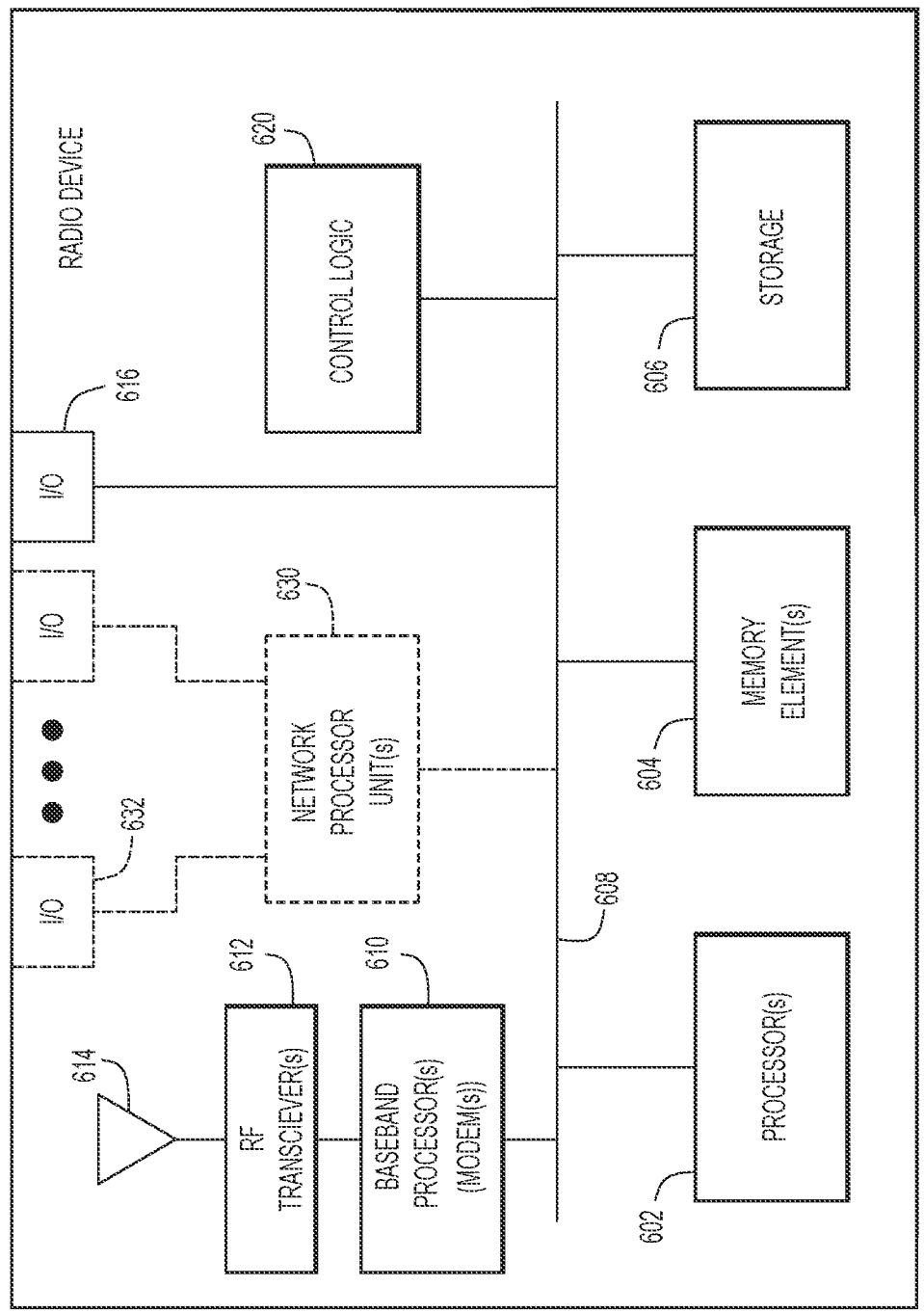
FIG. 6 is a hardware block diagram of a radio device that may perform functions associated with operations discussed herein and/or in connection with the techniques depicted in any one or more of FIGS. 1-5.

FIG. 6 is a hardware block diagram of a radio device 600 that may perform functions associated with operations discussed herein above and/or in connection with the techniques depicted in any one or more of FIGS. 1-5. In various embodiments, any of devices, such as wireless client devices, STAs 112-1 and 112-2, and/or AP 104 discussed above may implement, in some embodiments, a computing/radio architecture analogous to that described below with respect to the radio device 600.

In at least one embodiment, radio device 600 may be any apparatus that may include one or more processor(s) 602, one or more memory element(s) 604, storage 606, a bus 608, a baseband processor or modem 610, one or more radio RF transceiver(s) 612, one or more antenna(s) or antenna array(s) 614, one or more I/O interface(s) 616, and control logic 620. In various embodiments, instructions associated with logic for radio device 600 can overlap in any manner and are not limited to the specific allocation of instructions and/or operations described herein.

In at least one embodiment, processor(s) 602 is/are at least one hardware processor configured to execute various tasks, operations and/or functions for radio device 600 as described herein according to software and/or instructions configured for radio device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, graphical processing units (GPUs), microprocessors, digital signal processor, baseband signal processor, modem, physical layer (PHY), computing devices, systems, managers, logic, and/or machines described herein can be construed as being encompassed within the broad term 'processor'.

In at least one embodiment, memory element(s) 604 and/or storage 606 is/are configured to store data, information, software, and/or instructions associated with radio device 600, and/or logic configured for memory element(s) 604 and/or storage 606. For example, any logic described herein (e.g., control logic 620) can, in various embodiments, be stored for radio device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of radio device 600 to communicate in order to exchange information and/or data. Bus 608 can be implemented with any architecture designed for passing control, data and/or information between processors, memory elements/storage, peripheral devices, and/or any other hardware and/or software components that are configured for radio device 600. In at least one embodiment, bus 608 is implemented as a fast kernel-hosted interconnect, potentially using shared memory between processes (e.g., logic), which can enable efficient communication paths between the processes.

The RF transceiver(s) 612 may perform RF transmission and RF reception of wireless signals via antenna(s)/antenna array(s) 614, and the baseband processor (modem) 610 performs baseband modulation and demodulation, etc. associated with such signals to enable wireless communications for radio device 600.

For embodiments in which radio device 600 may be implemented as an AP (e.g., AP 104 connected to WLC 102), radio device 600 may additionally include one or more network processor unit(s) 630, which may enable communication between radio device 600 and other systems, devices, or entities, (e.g., WLC 102) via network I/O interface(s) 632 (wired and/or wireless) to facilitate operations discussed for various embodiments described herein. In various embodiments, network processor unit(s) 630 can be configured as a combination of hardware and/or software, such as one or more Ethernet driver(s) and/or computing device(s) or interface cards, Fibre Channel (e.g., optical) driver(s) and/or computing device(s), wireless receivers/transmitters/transceivers, baseband processor(s)/modem(s), and/or other similar network interface driver(s) and/or computing device(s) now known or hereafter developed to enable communications between radio device 600 and other systems, devices, or entities to facilitate operations for various embodiments described herein. In various embodiments, network I/O interface(s) 632 can be configured as one or more Ethernet port(s), Fibre Channel ports, any other I/O port(s), and/or antenna(s)/antenna array(s) now known or hereafter developed. Thus, the network processor unit(s) 630 and/or network I/O interface(s) 632 may include suitable interfaces for receiving, transmitting, and/or otherwise communicating data and/or information in a network environment.

I/O interface(s) 616 allow for input and output of data and/or information with other entities that are connected to radio device 600. For example, I/O interface(s) 616 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, particularly when the radio device 600 serves as a STA as described herein. In some embodiments, the radio device 600 supports a display having touch-screen display capabilities.

In various embodiments, control logic 620 can include instructions that, when executed, cause processor(s) 602 to perform operations, which can include, but not be limited to, providing overall control operations of radio device 600; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, institute of electrical and electronics engineers (IEEE) 802.11, Wi-Fi®, Wi-Fi6®, IEEE 802.16 (e.g., Worldwide Interoperability for Microwave Access (WiMAX)), Radio-Frequency Identification (RFID), Near Field Communication (NFC), Bluetooth™, millimeter (mm).wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, access points, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 4) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In one form, a computer-implemented method is provided, which may include providing, by an access point (AP), a first communication indicating that the AP supports a Media Access Control (MAC) address rotation management protocol; obtaining, by the AP, a second communication from a wireless station (STA) indicating that the STA intends to perform a MAC address rotation; and transmitting, by the AP, a third communication to influence the MAC address rotation of the STA, the third communication comprising a rotation status indicator and timing information.

In one instance, the second communication is an informational query included in a first Robust Action frame obtained from the STA and the third communication is a request included in a second Robust Action frame transmitted by the AP. In one instance, each of the first Robust Action frame and the second Robust Action frame comprises an identifier indicating that the first Robust Action frame and the second Robust Action frame are each associated with the MAC address rotation management protocol.

In one instance, the timing information is a delay timer value indicating the STA is to immediately perform the MAC address rotation. In one instance, the timing information is a rotation timer value indicating a time interval or schedule for the STA to perform the MAC address rotation. In one instance, the timing information is a comeback timer value indicating that the STA is to send a fourth communication indicating that the STA intends to perform the MAC address rotation upon expiration of the comeback timer value. In one instance, the timing information is a comeback timer value indicating that the STA is to await an instruction from the AP before performing the MAC address rotation.

In one instance, upon the second communication obtained from the STA comprising a rotation schedule including a rotation timer value that the STA intends to utilize to perform the MAC address rotation, at least one of the rotation status indicator and the timing information of the third communication indicates whether the AP is capable of supporting the rotation schedule or is not capable of supporting the rotation schedule. In one instance, the timing information of the previous instance is one of a reserved value indicating that either that the AP is capable or not capable of supporting the rotation schedule or is an alternate rotation timer value.

In one instance, the timing information indicates a time period window within which the STA is to generate a random number that identifies when the STA is to perform the MAC address rotation.

In one instance, the rotation status indicator indicates a recommendation for the STA to proceed or not to proceed with the MAC address rotation. In one instance, upon the rotation status indicator indicating the recommendation for the STA to not to proceed with the MAC address rotation of the previous instance, the third communication further indicates a reason for the recommendation for the STA to not to proceed with the MAC address rotation. In one instance, the method of the previous instance may further include upon obtaining by the AP an authentication request, an association request, or a reassociation request from the STA indicating that the STA has performed the MAC address rotation, rejecting the authentication request, the association request, or the reassociation request. In one instance, upon the rotation status indicator indicating the recommendation for the STA to not to proceed with the MAC address rotation, the method may include determining, by the AP, that the STA can proceed with the MAC address rotation; and transmitting, by the AP, an unsolicited fourth communication comprising another rotation status indicator and other timing information that seeks to influence the MAC address rotation of the STA.

In one form, an access point is provided, comprising: at least one memory element for storing data; and at least one processor for executing instructions associated with the data, wherein executing the instructions causes the access point to perform operations, comprising: providing, by the access point, a first communication indicating that the access point supports a Media Access Control (MAC) address rotation management protocol; obtaining, by the access point, a second communication from a wireless station (STA) indicating that the STA intends to perform a MAC address rotation; and transmitting, by the access point, a third communication to influence the MAC address rotation of the STA, the third communication comprising a rotation status indicator and timing information.

The methods presented herein may be embodied in a non-transitory computer readable storage medium comprising instructions that when executed configure one or more processors to perform the operations of the method.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
providing, by an access point (AP), a first communication indicating that the AP supports a Media Access Control (MAC) address rotation management protocol;
obtaining, by the AP, a second communication from a wireless station (STA) indicating that the STA intends to perform a MAC address rotation; and
transmitting, by the AP, a third communication to influence the MAC address rotation of the STA, the third communication comprising a rotation status indicator and timing information, wherein the timing information indicates a schedule for the STA to perform the MAC address rotation.

2. The method of claim 1, wherein the second communication is an informational query included in a first Robust Action frame obtained from the STA and the third communication is a request included in a second Robust Action frame transmitted by the AP.

3. The method of claim 2, wherein each of the first Robust Action frame and the second Robust Action frame comprises an identifier indicating that the first Robust Action frame and the second Robust Action frame are each associated with the MAC address rotation management protocol.

4. The method of claim 1, wherein the timing information further includes a delay timer value indicating when the STA is to perform the MAC address rotation.

5. The method of claim 1, wherein the timing information further includes a rotation timer value indicating a time interval for the STA to perform the MAC address rotation.

6. The method of claim 1, wherein the timing information further includes a comeback timer value indicating that the STA is to send a fourth communication indicating that the STA intends to perform the MAC address rotation upon expiration of the comeback timer value.

7. The method of claim 1, wherein the timing information further includes a comeback timer value indicating that the STA is to await an instruction from the AP before performing the MAC address rotation.

8. The method of claim 1, wherein upon the second communication obtained from the STA comprising a rotation schedule including a rotation timer value that the STA intends to utilize to perform the MAC address rotation, at least one of the rotation status indicator and the timing information of the third communication indicates whether the AP is capable of supporting the rotation schedule or is not capable of supporting the rotation schedule.

9. The method of claim 8, wherein the timing information is one of a reserved value indicating that either that the AP is capable or not capable of supporting the rotation schedule or is an alternate rotation timer value.

10. The method of claim 1, wherein the timing information indicates a time period window within which the STA is to generate a random number that identifies when the STA is to perform the MAC address rotation.

11. The method of claim 1, wherein the rotation status indicator indicates a recommendation for the STA to proceed or not to proceed with the MAC address rotation.

12. The method of claim 11, wherein upon the rotation status indicator indicating the recommendation for the STA to not to proceed with the MAC address rotation, the third communication further indicates a reason for the recommendation for the STA to not to proceed with the MAC address rotation.

13. The method of claim 12, further comprising:
upon obtaining by the AP an authentication request, an association request, or a reassociation request from the STA indicating that the STA has performed the MAC address rotation, rejecting the authentication request, the association request, or the reassociation request.

14. The method of claim 12, further comprising:
determining, by the AP, that the STA can proceed with the MAC address rotation; and
transmitting, by the AP, an unsolicited fourth communication comprising another rotation status indicator and other timing information that seeks to influence the MAC address rotation of the STA.

15. One or more non-transitory computer readable storage media encoded with instructions that, when executed by a processor of an access point (AP), cause the processor to perform operations, comprising:
providing a first communication indicating that the AP supports a Media Access Control (MAC) address rotation management protocol;
obtaining a second communication from a wireless station (STA) indicating that the STA intends to perform a MAC address rotation; and
transmitting a third communication to influence the MAC address rotation of the STA, the third communication comprising a rotation status indicator and timing information, wherein the timing information indicates a schedule for the STA to perform the MAC address rotation.

16. The media of claim 15, wherein the timing information further includes a delay timer value indicating when the STA is to perform the MAC address rotation.

17. The media of claim 15, wherein the timing information further includes a rotation timer value indicating a time interval for the STA to perform the MAC address rotation.

18. An apparatus comprising:
at least one memory element for storing data; and
at least one processor for executing instructions associated with the data, wherein executing the instructions causes the apparatus to perform operations, comprising:
providing a first communication indicating that the apparatus supports a Media Access Control (MAC) address rotation management protocol;
obtaining a second communication from a wireless station (STA) indicating that the STA intends to perform a MAC address rotation; and
transmitting a third communication to influence the MAC address rotation of the STA, the third communication comprising a rotation status indicator and timing information, wherein the timing information indicates a schedule for the STA to perform the MAC address rotation.

19. The apparatus of claim 18, wherein the timing information further includes a delay timer value indicating when the STA is to perform the MAC address rotation.

20. The apparatus of claim 18, wherein the timing information further includes a rotation timer value indicating a time interval for the STA to perform the MAC address rotation.

* * * * *